(12) United States Patent
Kang et al.

(10) Patent No.: US 8,418,959 B2
(45) Date of Patent: Apr. 16, 2013

(54) UNMANNED AERIAL VEHICLE HAVING SPHERICAL LOADING PORTION AND UNMANNED GROUND VEHICLE THEREFOR

(75) Inventors: Beom-Soo Kang, Pusan (KR); Woo-Jin Song, Pusan (KR); Tae-Wan Ku, Pusan (KR); Young-Seop Byun, Pusan (KR)

(73) Assignee: Pusan National University Industry—University Cooperation Foundation, Pusan (KR)

( * ) Notice: Subject to any disclaimer, the term of this patent is extended or adjusted under 35 U.S.C. 154(b) by 66 days.

(21) Appl. No.: 12/874,173

(22) Filed: Sep. 1, 2010

(65) Prior Publication Data
US 2011/0068224 A1 Mar. 24, 2011

(30) Foreign Application Priority Data

Sep. 2, 2009 (KR) .................. 10-2009-0082687

(51) Int. Cl.
*B64F 1/12* (2006.01)
(52) U.S. Cl.
USPC .............. 244/116; 244/17.23; 244/114 R
(58) Field of Classification Search ............. 244/17.11, 244/17.23, 108, 114 R, 115, 116
See application file for complete search history.

(56) References Cited

U.S. PATENT DOCUMENTS

| | | | | |
|---|---|---|---|---|
| 3,135,057 A * | 6/1964 | Nelson et al. | .................. | 434/34 |
| 3,149,803 A * | 9/1964 | Petrides et al. | ............ | 244/17.13 |
| 3,395,876 A * | 8/1968 | Green | ......................... | 244/23 C |
| 3,507,461 A * | 4/1970 | Rosta | ......................... | 244/17.23 |
| 3,795,372 A * | 3/1974 | Feldman | ............................ | 244/2 |
| 4,184,654 A * | 1/1980 | Herrera | ............................ | 244/8 |
| 5,490,784 A | 2/1996 | Carmein | | |
| 5,667,167 A * | 9/1997 | Kistler | ..................... | 244/110 E |
| 7,093,790 B1* | 8/2006 | Davidson | ....................... | 244/33 |
| 2003/0125119 A1 | 7/2003 | Jones | | |
| 2004/0167682 A1 | 8/2004 | Beck | | |

FOREIGN PATENT DOCUMENTS

JP 2003341599 12/2003

* cited by examiner

*Primary Examiner* — Timothy D Collins
*Assistant Examiner* — Jamie S Stehle
(74) *Attorney, Agent, or Firm* — Patent Office of Dr. Chung Park

(57) ABSTRACT

An unmanned aerial vehicle equipped with a spherical locking portion for landing on an unmanned ground vehicle is disclosed. The spherical locking portion can be the body of the unmanned aerial vehicle. Further, an unmanned ground vehicle for landing of an unmanned aerial vehicle, comprising a landing portion configured to have some of a spherical locking portion of the unmanned aerial vehicle inserted therein is disclosed.

10 Claims, 5 Drawing Sheets

(a)

(b)

(a)   (b)

(a)   (b)

Elevation angle            Azimuth

UNMANNED AERIAL VEHICLE HAVING SPHERICAL LOADING PORTION AND UNMANNED GROUND VEHICLE THEREFOR

BACKGROUND OF THE INVENTION

1. Field of the Invention

The present invention relates to an unmanned aerial vehicle and an unmanned ground vehicle having the unmanned aerial vehicle locked therein, and more particularly, to an unmanned aerial vehicle which can easily take off and land irrespective of whether an unmanned ground vehicle is horizontal, and an unmanned ground vehicle having the unmanned aerial vehicle locked therein.

2. Background of the Related Art

An Unmanned Aerial Vehicle (UAV) and an Unmanned Ground Vehicle (UGV) are platforms which can have their postures and locations automatically controlled by on-board computers locked therein and can move to a desired location in response to a command generated by a remote control center. Various forms and sizes of the unmanned aerial vehicles and the unmanned ground vehicles have been developed particularly in the observation and reconnaissance fields.

The unmanned aerial vehicles can be classified into a fixed wing type unmanned aerial vehicle and a rotating wing type unmanned aerial vehicle according to their types. The rotating wing type unmanned aerial vehicle is advantageous in that it can accomplish its duty even without a runway because it can hover and vertically take off and land and it can perform observation and reconnaissance at close range because it is less influenced by geographical features, such as obstacles, can approach an interested target, and perform reconnaissance, as compared with the fixed wing type unmanned aerial vehicle. In particular, a coaxial rotor type helicopter including upper and lower main rotors can be simplified in shape because it does not have a tail rotor and so is suitable for an unmanned aerial vehicle for observation and reconnaissance.

On the other hand, the rotating wing type unmanned aerial vehicle is disadvantageous in that it has limited duration of flight because of its high power consumption, as compared with the fixed wing type unmanned aerial vehicle having duration of flight which is at least 2 or 3 times or a maximum of 10 times in the same takeoff weight.

Meanwhile, the unmanned ground vehicle is less influenced by the weight on board or time taken in traveling than the unmanned aerial vehicle, but has a limited range of traveling because of geographical features or obstacles and so has limited observation and reconnaissance information.

For the above reasons, an UAV-UGV teaming operation in which the rotating wing type unmanned aerial vehicle and the unmanned ground vehicle are integrated is being developed. That is, the UAV-UGV teaming operation is a concept in which a small-sized unmanned aerial vehicle capable of vertically taking off and landing is locked in the unmanned ground vehicle and moved. The locked unmanned aerial vehicle is recharged with power of the unmanned ground vehicle, and the unmanned aerial vehicle takes charge of areas which cannot be observed and reconnoitered by the unmanned ground vehicle. Accordingly, the unmanned aerial vehicle and the unmanned ground vehicle can compensate for counterpart's advantages and disadvantages.

However, since the unmanned ground vehicle usually runs in hazardous areas, the unmanned aerial vehicle rarely maintains a horizontal state when the unmanned aerial vehicle locked in the unmanned ground vehicle attempts takeoff and landing, which makes a smooth takeoff and landing difficult.

Further, in order for the unmanned aerial vehicle to be recharged by power of the unmanned ground vehicle, the coupler of the unmanned aerial vehicle must very precisely land on the same location of the power supply unit of the unmanned ground vehicle.

In order to solve the above problems, attempts have been made to attach a leveling apparatus to the unmanned ground vehicle for maintaining it in a horizontal state, when the unmanned aerial vehicle takes off and lands. However, the leveling apparatus is an additional apparatus for only takeoff and landing, and it increases the weight and complexity of the system.

Accordingly, there is a need for a new solution in which the unmanned aerial vehicle can easily take off and land irrespective of whether the unmanned ground vehicle is in a horizontal state without increasing the weight and complexity of a system.

SUMMARY OF THE INVENTION

The present invention has been made in view of the above problems occurring in the prior art, and it is an object of the present invention to provide an unmanned aerial vehicle and an unmanned ground vehicle having the unmanned aerial vehicle locked therein.

Another object of the present invention is to allow an unmanned aerial vehicle to easily take off and land irrespective of whether an unmanned ground vehicle is horizontal.

Yet another object of the present invention is to provide an unmanned aerial vehicle which can independently land.

Still yet another object of the present invention is to recharge the power source of an unmanned aerial vehicle.

Still yet another object of the present invention is to provide an unmanned ground vehicle which can stably fix an unmanned aerial vehicle landed thereon.

Still yet another object of the present invention is to provide an unmanned ground vehicle which can fix an unmanned aerial vehicle thereto, while not hindering the takeoff and landing of the unmanned aerial vehicle.

Still yet another object of the present invention is to provide an unmanned ground vehicle which can move an unmanned aerial vehicle, landed thereon, to a desired location.

Still yet another object of the present invention is to provide an unmanned ground vehicle which can precisely control the location of an unmanned aerial vehicle landed thereon.

Still yet another object of the present invention is to provide an unmanned ground vehicle capable of aligning an unmanned aerial vehicle always at the same location, although location errors are generated upon landing, by precisely controlling the location of the unmanned aerial vehicle after landing.

Still yet another object of the present invention is to provide an unmanned ground vehicle having reduced weight by removing a need of a leveling apparatus.

All the above and other objects of the present invention can be achieved by the present invention described in below. Hereinafter, the present invention is described in detail.

To achieve the above objects, an unmanned aerial vehicle according to the present invention includes a spherical locking portion for landing on an unmanned ground vehicle, and the unmanned ground vehicle according to the present invention includes a landing portion configured to have some of the spherical locking portion of the unmanned aerial vehicle inserted therein. Accordingly, the unmanned aerial vehicle can easily take off from and land on the unmanned ground vehicle irrespective of whether the unmanned ground vehicle is horizontal.

The spherical locking portion can be constructed of the body of the unmanned aerial vehicle. Accordingly, the unmanned aerial vehicle can be simplified in structure and reduced in weight. Further, the landing portion can have a hemispherical form corresponding to some of the spherical locking portion.

The unmanned aerial vehicle can further comprise foldable alighting portions necessary for the unmanned aerial vehicle to independently land.

The spherical locking portion is equipped with a coupler coupled with a power supply unit of the unmanned ground vehicle and configured to recharge the power supply unit with a power source. A power supply unit, coupled with the coupler of the unmanned aerial vehicle and configured to supply a power source for recharging the unmanned aerial vehicle, is formed within the landing portion. Accordingly, the unmanned aerial vehicle can be recharged with the power source while landing on the unmanned ground vehicle.

The unmanned ground vehicle can further comprise a restraint device for fixing the unmanned aerial vehicle landed at the landing portion. The restraint device can comprise a plurality of link arms movable close to or far from the location where the unmanned aerial vehicle is landed so that they do not hinder the takeoff and landing of the unmanned aerial vehicle while stably fixing the unmanned aerial vehicle.

The unmanned ground vehicle can further comprise a moving device for rotating and moving the landed unmanned aerial vehicle to a desired location. The moving device can be composed of driving wheels placed at the ends of respective link portions coming in contact with the unmanned aerial vehicle.

The driving wheels can be rotated in a direction to align an elevation angle and an azimuth angle so that the unmanned aerial vehicle can be freely rotated and moved to a location where the unmanned aerial vehicle is in equilibrium with the unmanned ground vehicle or a location where the coupler of the unmanned aerial vehicle is coupled with a power supply unit of the unmanned ground vehicle when the unmanned aerial vehicle is landed, or a location where the unmanned aerial vehicle is horizontal when it takes off.

The unmanned aerial vehicle of the present invention is advantageous in that it is capable of independent landing/takeoff as well as of coupling landing/takeoff irrespective of whether an unmanned ground vehicle is horizontal. Further, the landed unmanned aerial vehicle can be fixed stably. The unmanned ground vehicle of the present invention is advantageous in that it is capable of aligning an unmanned aerial vehicle always at the same location, although location errors are generated upon landing, by precisely controlling the location of the landed unmanned aerial vehicle. Further, the weight of the unmanned ground vehicle can be reduced weight since it needs no leveling apparatus.

BRIEF DESCRIPTION OF THE DRAWINGS

The objects and advantages of the invention can be more fully understood from the following detailed description taken in conjunction with the accompanying drawings in which:

FIG. 1 schematically shows situations in which an unmanned aerial vehicle lands on the surface of an unmanned ground vehicle, wherein FIG. 1a shows a case where the unmanned ground vehicle is horizontal, and FIG. 1b shows a case where the unmanned ground vehicle is inclined;

FIG. 2 schematically shows situations in which an unmanned aerial vehicle according to the present invention lands on the surface of an unmanned ground vehicle, wherein FIG. 2a shows a case where the unmanned ground vehicle is horizontal, and FIG. 2b shows a case where the unmanned ground vehicle is inclined;

FIG. 3 is perspective views of the unmanned aerial vehicle according to the present invention, wherein

DETAILED DESCRIPTION OF EMBODIMENTS

The present invention will become more evident through the following embodiments. The following embodiments are only illustrative and are not intended to limit or restrict the scope of the present invention.

Figure 1:
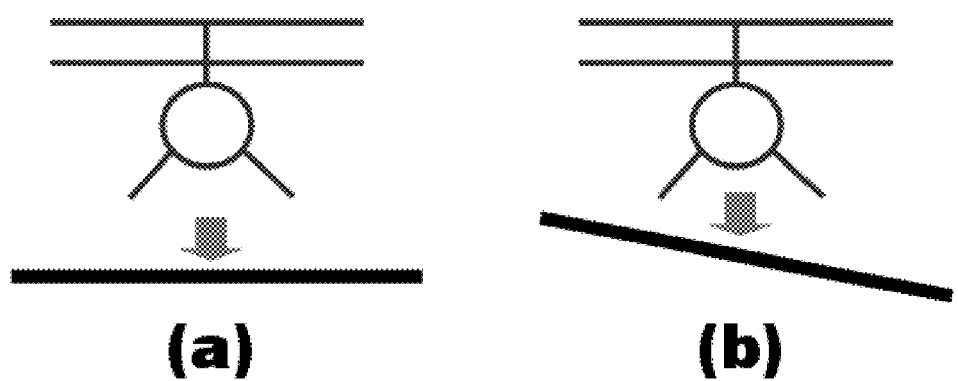

As shown in FIG. 1a, an unmanned ground vehicle has a flat surface, and an unmanned aerial vehicle lands on and takes off from the flat surface. However, since the unmanned ground vehicle mainly moves on plains or hazardous locations in its practical use, when the unmanned ground vehicle stops in order for the unmanned aerial vehicle to land on or take off therefrom, the surface of the unmanned ground vehicle is inclined as shown in FIG. 1b. It makes it difficult for an unmanned aerial vehicle, having a skid type landing gear (refer to FIG. 1) or a wheel type landing gear, to smoothly land on or take off from the surface of the unmanned ground vehicle.

Figure 2:
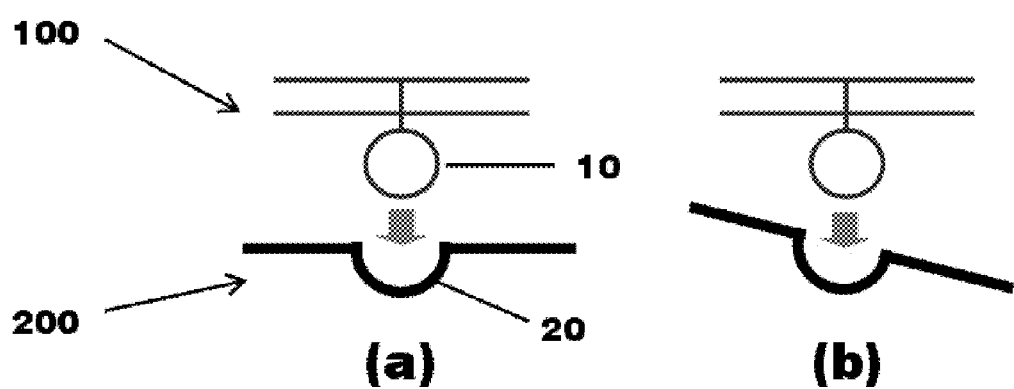

To solve the above problem, in the present invention, as shown in FIG. 2a, an unmanned aerial vehicle 100 is equipped with a spherical locking portion 10 for coupling landing on an unmanned ground vehicle 200, and the unmanned ground vehicle 200 is equipped with a landing portion 20 to which the spherical locking portion 10 of the unmanned aerial vehicle 100 is coupled. Accordingly, as shown in FIG. 2b, in case where a surface of the unmanned ground vehicle 200 is not in a horizontal state, but inclined, the unmanned aerial vehicle 100 can be easily accommodated in the concave landing portion 20. Further, even though some location errors are occurred, the unmanned aerial vehicle 100 can always land at the same location.

A preferred embodiment of the unmanned aerial vehicle 100 according to the present invention is shown in FIG. 3.

The spherical locking portion 10 included in the unmanned aerial vehicle 100 according to the present invention may be separately provided at the bottom of the body of the unmanned aerial vehicle 100. However, as shown in FIG. 3, in order to simplify the structure of the unmanned aerial vehicle 100 and to reduce the weight of the vehicle, it is preferred that the body itself of the unmanned aerial vehicle 100 be constructed of the spherical locking portion 10. In case where the unmanned aerial vehicle 100 is constructed of the spherical body as described above, there is an additional advantage in that nonlinear fluid flowing caused by disturbance due to a symmetrical axial shape can be reduced.

Further, in case where the unmanned aerial vehicle 100 is constructed of the spherical body, it is preferred that the unmanned aerial vehicle 100 of the present invention be applied to a coaxial rotor type helicopter including two main rotors since a normal helicopter needs a tail rotor.

Figure 3A:
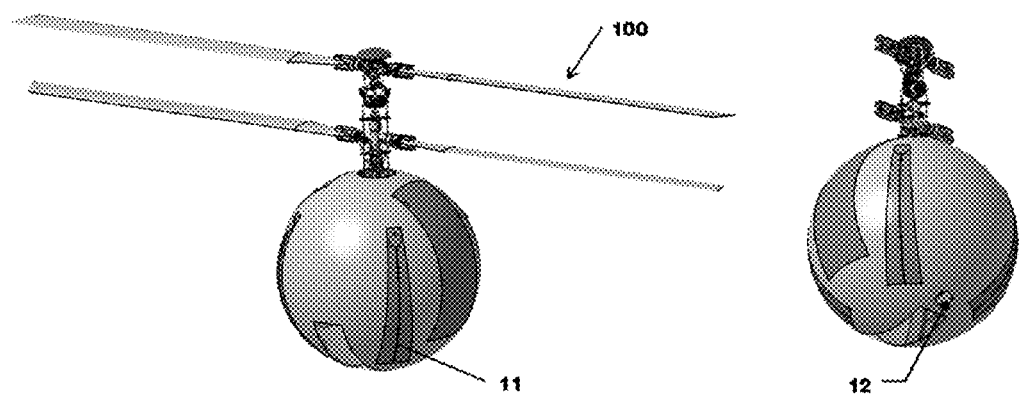
FIG. 3a shows a state in which a foldable alighting portions is folded and FIG. 3b shows a state in which the foldable alighting portions is unfolded.
Figure 3B:
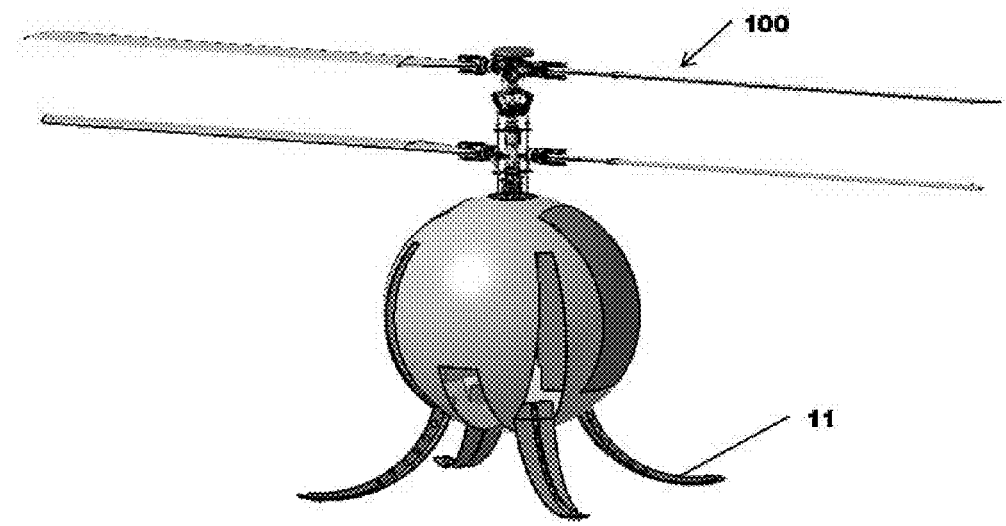

The spherical locking portion 10 of the present invention can further include foldable alighting portions 11, as shown in FIG. 3. That is, in case where the unmanned aerial vehicle 100 of the present invention lands on the unmanned ground vehicle 200, common landing gears are not required. However, in order for the unmanned aerial vehicle 100 to independently land at locations other than the unmanned ground vehicle 200, landing gears can be needed. To this end, the foldable alighting portions 11 do not externally protrude from the spherical locking portion 10 at normal times (refer to FIG. 3*a*), but are spread out from the spherical locking portion 10 and function as the landing gears for the purpose of the independent landing (refer to FIG. 3*b*).

The unmanned aerial vehicle, in particular, the shown helicopter type unmanned aerial vehicle, can further include a coupler 12 for power recharging in the spherical locking portion since it has high power consumption. The coupler 12 is coupled to the power supply unit 21 of the unmanned ground vehicle 200 for power recharging. Therefore, it is preferred that the coupler 12 be disposed at a location where it comes in contact with the landing portion 20 of the unmanned ground vehicle 200, from the spherical locking portion 10, and be configured not to externally protrude from the spherical locking portion 10. The unmanned ground vehicle 200 according to the present invention includes the landing portion 20 into which some of the spherical locking portion 10 of the unmanned aerial vehicle 100 are inserted, and coupling landed.

Figure 4:
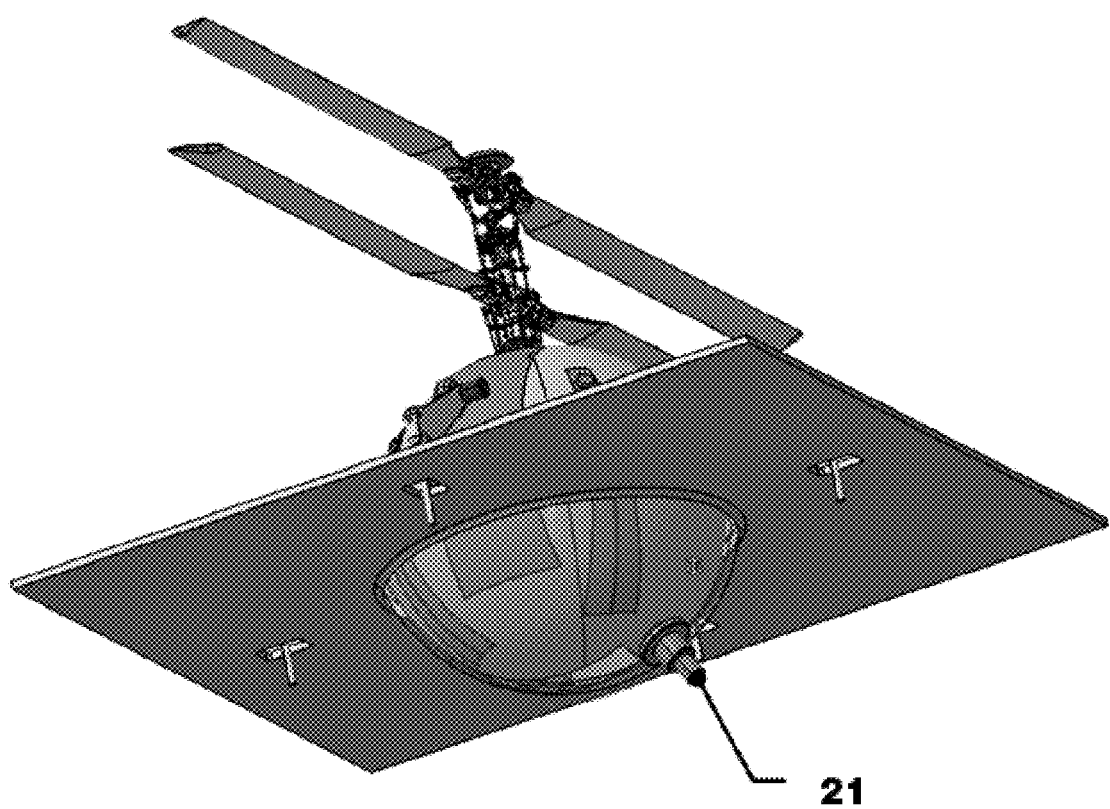
FIG. 4 is a partially cut-away perspective view showing a state in which after the unmanned aerial vehicle according to the present invention lands on the landing portion of an unmanned ground vehicle according to the present invention, it is coupled to the landing portion for recharging.
Figure 5:
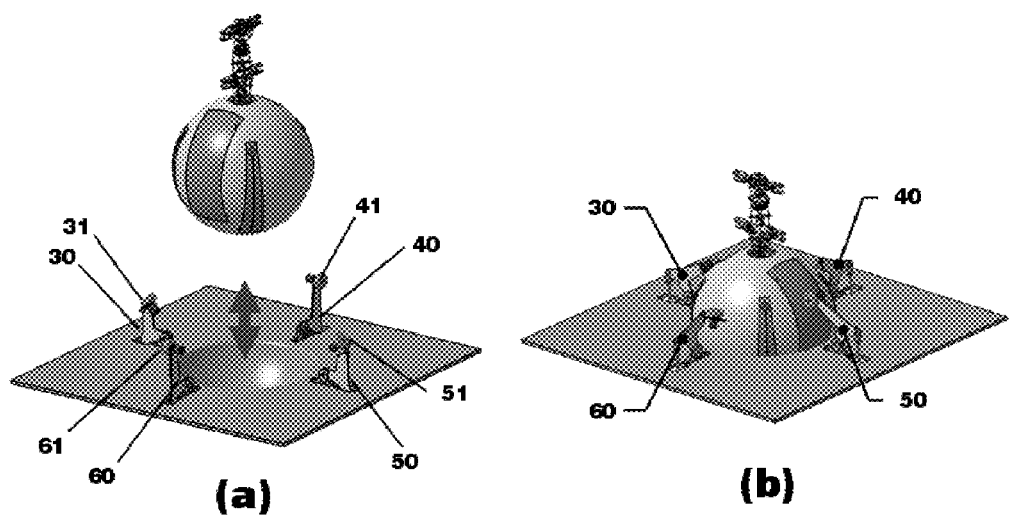
FIG. 5 shows the movement of link portions (i.e., restraint devices) after the unmanned aerial vehicle according to the present invention lands on the landing portion.

The landing portion 20 is formed to have a recess into the unmanned ground vehicle 200 so that the spherical locking portion 10 can be seated in the recess as shown in FIG. 4. The landing portion 20 can have a circular hole-shaped periphery corresponding to the spherical locking portion 10, and preferably have a hemispherical body corresponding to some of the spherical locking portion 10, as shown in FIG. 5.

The power supply unit 21 formed within the landing portion 20 is coupled with the coupler 12 of the unmanned aerial vehicle 100 and configured to supply a power source for the recharging of the unmanned aerial vehicle 100. It is preferred that the power supply unit 21 be formed at a location corresponding to the coupler 12 when the unmanned aerial vehicle 100 is placed parallel with the unmanned ground vehicle 200.

The unmanned aerial vehicle 100 moves together with the unmanned ground vehicle 200 after landing on it. Accordingly, an appropriate restraint device for stably positioning the unmanned aerial vehicle 100 is installed in the unmanned ground vehicle 200. As a preferred embodiment, link arms 30, 40, 50, and 60, such as those shown in FIG. 5, can be installed as the restraint device.

The link arms 30, 40, 50, and 60 can be installed on a surface of the unmanned ground vehicle 200. The link arms can move close to or far from the location where the unmanned aerial vehicle 100 is landed so that they do not hinder the takeoff and landing of the unmanned aerial vehicle 100 while stably fixing the unmanned aerial vehicle 100. Here, the term 'moving' can include both straight-line and axial rotation. Further, although the number of link arms is illustrated to be 4 in FIG. 5, the number of link arms is not limited thereto, and those having ordinary skill in the art can properly set the number for fixing the unmanned aerial vehicle 100.

Even though the unmanned ground vehicle 200 mainly moving at hazardous locations is inclined according to road conditions and rarely maintains a horizontal state (i.e., vertical to a gravitational direction), the unmanned aerial vehicle 100 according to the present invention can easily land at the landing portion 20 of the unmanned aerial vehicle 100 through the spherical locking portion 10 included therein and can be stably fixed thereto by the restraint device.

However, if the unmanned aerial vehicle 100 is relatively inclined with respect to the unmanned ground vehicle 200, they do not stably move as compared with a state of equilibrium and power charging becomes difficult because the coupler 12 of the unmanned aerial vehicle 100 cannot be coupled to the power supply unit 21 of the unmanned ground vehicle 200.

Accordingly, it is preferred that the unmanned ground vehicle 200 further include a moving device for displacing the unmanned aerial vehicle 100, landed on the unmanned ground vehicle 200, to a desired position. The moving device can include driving wheels 31, 41, 51, and 61 at the ends of the respective link arms 30, 40, 50, and 60, coming into contact with the unmanned aerial vehicle 100.

Figure 6:
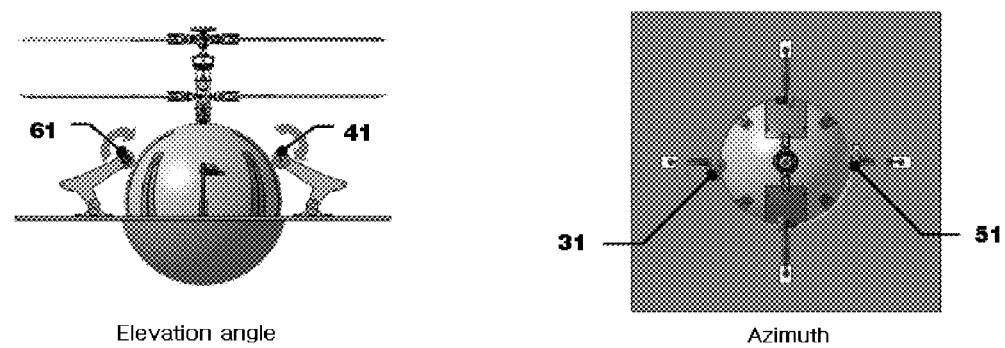
FIG. 6 shows a state in which a driving wheel aligns an elevation angle and an azimuth angle of the unmanned aerial vehicle according to the present invention.

It is preferred that the driving wheels 31, 41, 51, and 61 be rotated in a direction in which both the elevation angle and the azimuth angle of the unmanned aerial vehicle 100 can be aligned, as shown in FIG. 6. To this end, some of the driving wheels, for example, the driving wheels 41 and 61 facing each other are configured to control the elevation angle of the unmanned aerial vehicle 100, and the remaining driving wheels 31 and 51 are configured to control the azimuth angle of the unmanned aerial vehicle 100 so that the link arms 30, 40, 50, and 60 can align both the elevation angle and the azimuth angle of the unmanned aerial vehicle 100. In case where the number of link arms is small, the shaft of one driving wheel may be configured to be rotated so that it can align both the elevation angle and the azimuth angle of the unmanned aerial vehicle 100.

Through the driving wheels 31, 41, 51, and 61, the unmanned aerial vehicle 100 can be rotated and moved to a location where it is in equilibrium with the unmanned ground vehicle 200 or to a location where the coupler 12 of the unmanned aerial vehicle 100 is coupled with the power supply unit 21 when the unmanned aerial vehicle 100 lands on the unmanned ground vehicle 200. Upon takeoff, the unmanned aerial vehicle 100 can move to a location where it maintains horizontality.

Since the location of the landed unmanned aerial vehicle 100 can be freely moved as described above, a burden that the unmanned aerial vehicle 100 has to be precisely landed on the unmanned ground vehicle 200 can be reduced.

Figure 7:
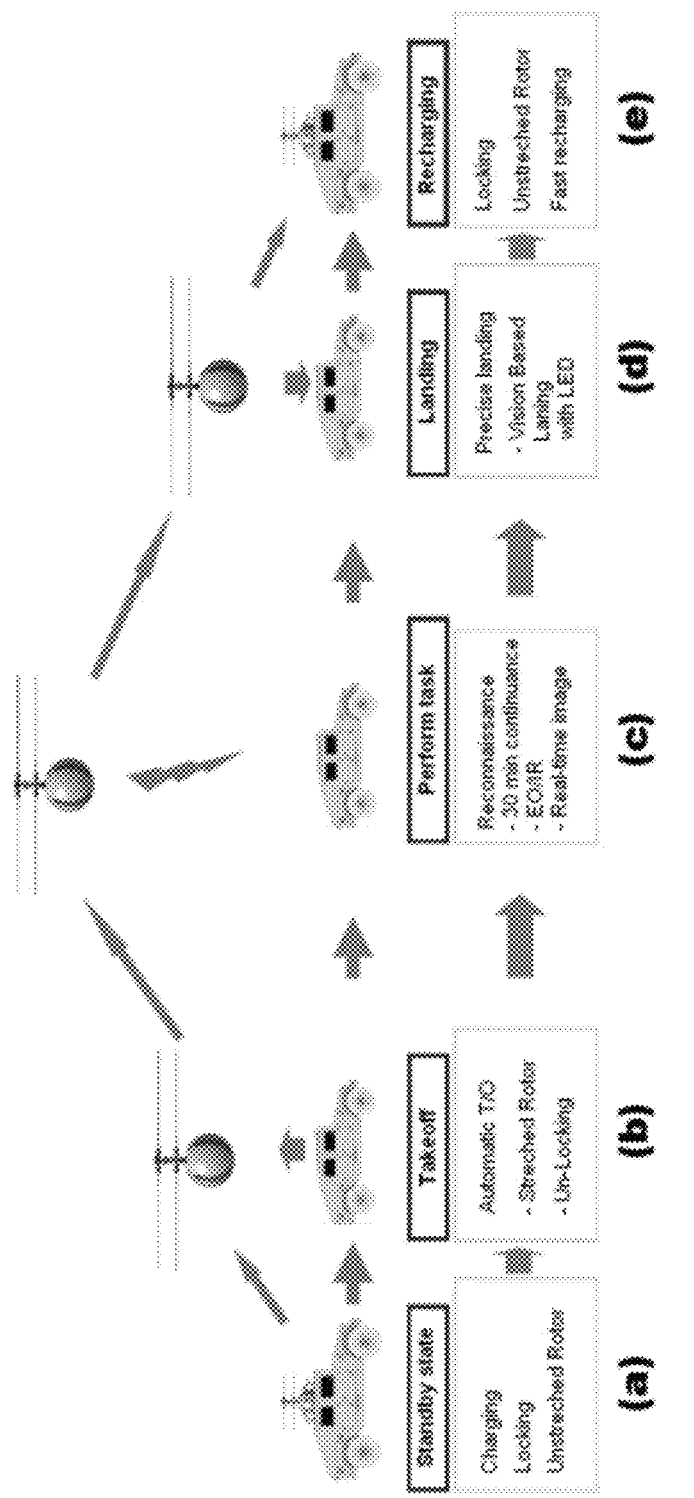
FIG. 7 shows a process of the unmanned aerial vehicle according to the present invention taking off from the unmanned ground vehicle and landing on the same.

States from takeoff from the unmanned ground vehicle 200 to a landing thereon, of the unmanned aerial vehicle 100 constructed as above according to the present invention, are schematically shown in FIG. 7.

Referring to FIG. 7, a series of operations of the unmanned aerial vehicle 100 and the unmanned ground vehicle 200 are described in detail when they perform a task. The unmanned aerial vehicle 100 is charged with it being locked in the unmanned ground vehicle 200 before takeoff (refer to FIG. 7*a*). Upon takeoff for observation and reconnaissance, first, the unmanned ground vehicle 200 maintains a stop state, the coupling of the coupler 12 and the power supply unit 21 is unlocked, the driving wheels 31, 41, 51, and 61 align the unmanned aerial vehicle 100 in a horizontal state, the link arms 30, 40, 50, and 60 are unlocked, and the unmanned aerial vehicle 100 then takes off (refer to FIG. 7b).

After takeoff, the unmanned aerial vehicle 100 performs the observation and reconnaissance task while communicating with the unmanned ground vehicle 200 (refer to FIG. 7c). The unmanned aerial vehicle 100 which has completed the task lands at the landing portion 20 of the inclined unmanned ground vehicle 200, and the link arms 30, 40, 50, and 60 are switched to a constraint state (refer to FIG. 7d). Then, the driving wheels 31, 41, 51, and 61 are driven to realign the posture of the unmanned aerial vehicle 100 such that the coupler 12 of the unmanned aerial vehicle 100 is coupled with the power supply unit 21 of the unmanned ground vehicle 200. Next, the coupler 12 and the power supply unit 21 are coupled together, so that recharging is performed (refer to FIG. 7e).

As described above, according to the present invention, the unmanned aerial vehicle of the present invention can easily land and take off upon not only independent landing, but also combined landing, irrespective of whether the unmanned ground vehicle is horizontal. After landing, the unmanned aerial vehicle can be stably fixed. Further, the unmanned ground vehicle of the present invention can precisely move the unmanned aerial vehicle landed thereon to a desired position. Thus, although location errors are occurred when the unmanned aerial vehicle lands, the unmanned ground vehicle can align the unmanned aerial vehicle always the same location. Consequently, there are advantages in that a burden that the unmanned aerial vehicle has to be precisely landed on the unmanned ground vehicle can be reduced and weight can be reduced because an additional leveling apparatus is not required.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An unmanned vehicle system comprising:
   an unmanned aerial vehicle comprising a spherical locking portion; and
   an independently operable unmanned ground vehicle comprising:
      a substantially hemispherical depression to accept insertion of some of the spherical locking portion to facilitate landing the unmanned aerial vehicle on the unmanned ground vehicle irrespective of whether the unmanned ground vehicle is inclined from a horizontal state; and
      a plurality of restraint arms configured to stably position the unmanned aerial vehicle when some of the spherical locking portion is inserted in the substantially hemispherical depression.

2. The unmanned vehicle system as claimed in claim 1, wherein the spherical locking portion is a body of the unmanned aerial vehicle.

3. The unmanned vehicle system as claimed in claim 1, wherein the unmanned aerial vehicle further comprises foldable alighting portions necessary for the unmanned aerial vehicle to independently land.

4. The unmanned vehicle system as claimed in claim 1, wherein the spherical locking portion comprises a coupler coupled with a power supply unit of the unmanned ground vehicle and configured to recharge the power supply unit with a power source.

5. The unmanned vehicle system as claimed in claim 1, wherein a power supply unit is provided within the substantially hemispherical depression, the power supply unit being coupled with a coupler of the unmanned aerial vehicle and configured to supply a power source for recharging the unmanned aerial vehicle.

6. The unmanned vehicle system as claimed in claim 1, wherein the plurality of restraint arms are further configured to be movable from a first position in which they do not hinder takeoff and landing of the unmanned aerial vehicle to a second position in which they stably position the unmanned aerial vehicle.

7. The unmanned vehicle system as claimed in claim 1, wherein the unmanned ground vehicle further comprises a moving device for rotating and moving the landed unmanned aerial vehicle to a desired location.

8. The unmanned vehicle system as claimed in claim 7, wherein the moving device comprises driving wheels respectively placed at ends of link portions, said driving wheels coming in contact with the unmanned aerial vehicle.

9. The unmanned vehicle system as claimed in claim 8, wherein the driving wheels are rotated in a direction in which the driving wheels can align an elevation angle and an azimuth angle.

10. The unmanned vehicle system as claimed in claim 7, wherein the desired location is a location where the unmanned aerial vehicle is in equilibrium with the unmanned ground vehicle, or a location where the coupler of the unmanned aerial vehicle is coupled with a power supply unit of the unmanned ground vehicle when the unmanned aerial vehicle is landed on the unmanned ground vehicle, or a location where the unmanned ground vehicle is horizontal to the unmanned aerial vehicle when the unmanned aerial vehicle takes off from the unmanned ground vehicle.

* * * * *